Dec. 27, 1955  E. W. ERNST  2,728,522
ANTICIPATOR SYSTEM
Filed April 21, 1951
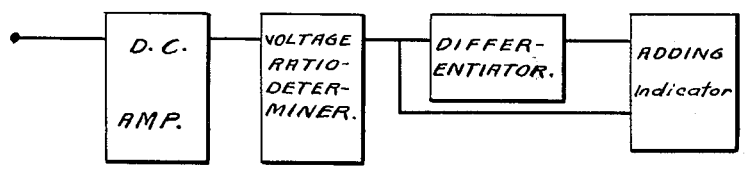
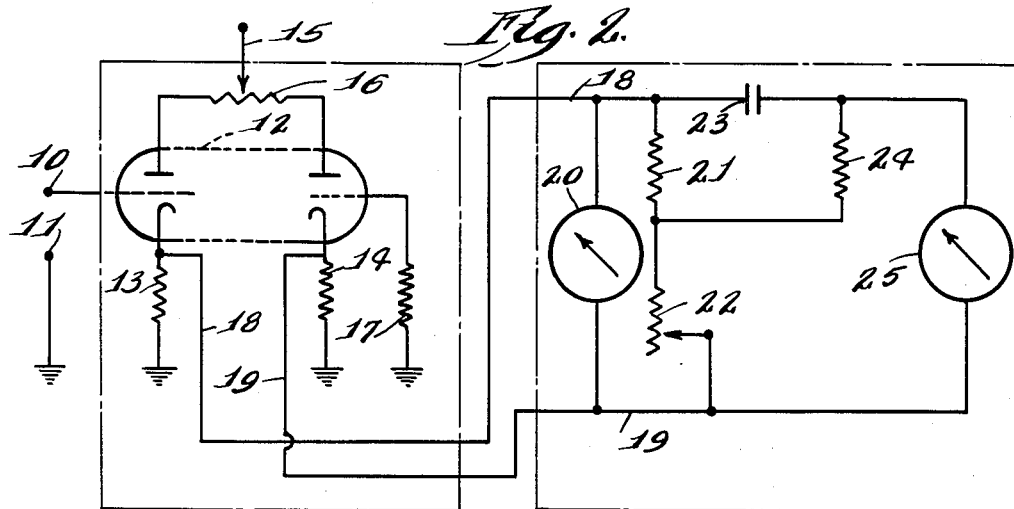
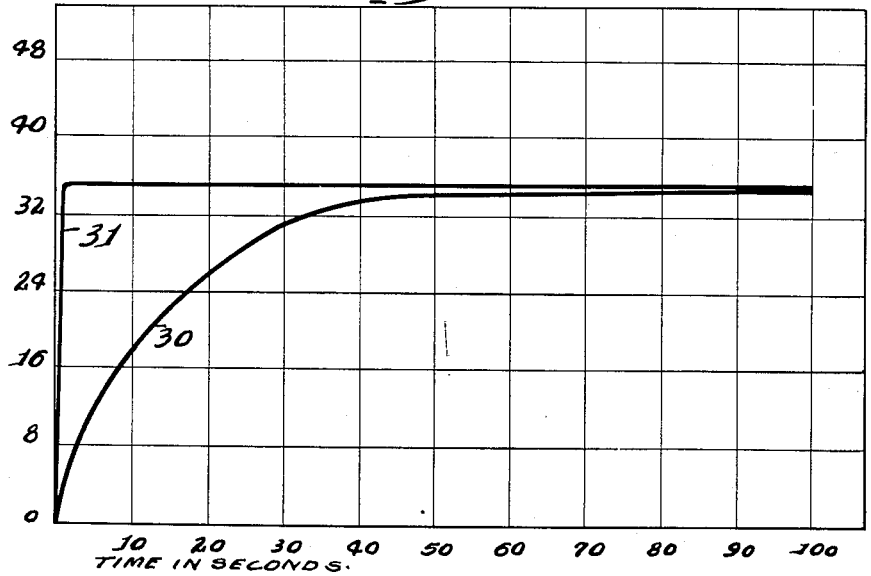
Inventor:
Edward W. Ernst.
By Schroeder, Merriam,
Hofgren & Brady.
Attorneys.

United States Patent Office 2,728,522
Patented Dec. 27, 1955

2,728,522

ANTICIPATOR SYSTEM

Edward W. Ernst, Urbana, Ill., assignor to University of Illinois Foundation, a nonprofit corporation of Illinois Application April 21, 1951, Serial No. 222,213

6 Claims. (Cl. 235—61)

This invention relates to an anticipator system, and more particularly to a method and apparatus for relatively quickly indicating the value of an electrical potential which varies in accordance with a simple exponential or first degree mathematical function, and which would in and of itself take a relatively long time to reach its ultimate value.

There are a number of situations where, as a part of indicating and instrumentation or as a phase of control operations, an electrical potential is provided which varies as a simple exponential function and which would take one or more minutes to reach its ultimate value. For example, when energy is supplied to a piece of rotating machinery, a large furnace or a conduction calorimeter, a given change in energy input to a particular new but temporarily fixed level will result in a gradual approach to an ultimate value of speed or temperature which may take several minutes to attain. In control operations it is desirable to anticipate this ultimate value in order to prevent overrunning or "hunting"; and in instrumentation, as in the measurement of power of very high frequency radio waves by a conduction calorimeter, it is desirable to provide an indication relatively instantly, as in a second or two, rather than to have to wait the one or two minutes heretofore otherwise normally required, for the new "steady state" to be reached.

I have devised and am here disclosing a simple, stable, yet very efficient and accurate anticipator system which will substantially instantly provide a resultant signal corresponding to the ultimate value which would be reached by an electrical potential derived from the factor varying with a long time constant, as speed of rotation of the mechanical device or temperature of the furnace or calorimeter. This resultant signal can then, for example, be used to provide an immediate indication as by a voltmeter, or for a control operation.

Other applications of my anticipator system will readily occur. For example, the desired rectangular shape of pulses sought in timing circuits, as in radar, could be improved by using a method and system of the character here disclosed rather than circuits providing a relatively simple exponential change.

As one specific example of my anticipator system, but only as a representative embodiment thereof, I will now describe a system as designed for use with a conduction calorimeter for measuring the power of very high frequency radio waves. Referring now more particularly to the drawings:

Figure 1 is a block diagram of an anticipator system designed to be actuated by the electrical potential developed by a thermocouple in a conduction calorimeter particularly designed for high frequency instrumentation purposes;

Figure 2 is a circuit diagram of the system indicated in block form in Figure 1; and Figure 3 is a chart indicating the relative curves of an initial electrical potential varying as a first degree function having a relatively long time constant, and the resultant signal from my anticipator system.

One of the most accurate methods of measuring radio frequency power at very high frequencies is by a conduction calorimeter. The power to be measured is dissipated in a resistive load provided by the calorimeter and the ultimate temperature differential between the calorimeter and its surroundings is measured to provide an indication of that power, when a steady state condition has been reached. If this method of measurement is to retain the desired sensitivity, however, at least a minute or more, and sometimes several minutes must be allowed for the steady state condition to be reached. If radiation transfer from the calorimeter is eliminated, and if free convection is not allowed, the resultant transfer of heat from the calorimeter to its surroundings will be by conduction only and will follow a simple exponential or mathematical first degree function. Such a calorimeter is illustrated and more particularly described in my thesis entitled "A Method of Reducing the Response Time of a Calorimeter" presented to the University of Illinois on or about May 29, 1950, as part of the requirements for the degree of Master of Science in Electrical Engineering.

In that or any properly designed conduction calorimeter the temperature distribution as a function of space coordinates may be assumed to be the same at any time, so that time variations will be of magnitude of temperature only; and the specific heat and mass being fixed, if the rate at which energy (as a very high frequency radio wave) is added to the system is constant, the heat transferred from the substance per unit time is a function of a simple exponential or first degree mathematical function, a function of the first power of the temperature difference between the substance and the surroundings. The mass, M, and specific heat, c, of the material of the calorimeter provide the thermal capacitance $Mc$, of the device, this thermal capacitance divided by the thermal conductance, $K$, of the transferring medium $$\left(\frac{Mc}{K}\right)$$

providing the time constant, $\tau$, of the calorimeter. If the device is to be kept as sensitive as desired for instrumentation purposes, this time constant cannot be too greatly reduced. For purposes of providing a representative example for use in the description of my anticipator system hereinafter provided, it may be assumed that in a very well designed conduction calorimeter this time constant is such as to require 80 seconds for a change in power input to result in a new steady state temperature.

If the general expression for relating the various quantities of this type of system be used (Worthing and Holliday, "Heat," John Wiley and Sons, New York (1948), page 101), and derivations be made and assumptions be used for the type of calorimeter where heat transfer is to be by conduction only, or by conduction with forced convection, it will be found that $$T = T_2 - (T_2 - T_1)e^{-t/\tau}$$

where $T$ is the temperature at any time $t$, $T_1$ is the original temperature of the system at time $t=0$, $T_2$ is the final temperature which the system will reach ($t=\infty$) and $\tau$ is the time constant of the calorimeter.

By taking the derivative of the above equation with respect to time, it will be found that for all time changes (i. e. greater than $t=0$)

$$T + \tau\left(\frac{dT}{dt}\right) = T_2$$

It will thus be found that the final temperature at any time ($T_2$) can be determined by differentiating at any instant to provide the rate of change of the variable factor at that time $$\left(\frac{dT}{dt}\right)$$

by multiplying this by the time constant ratio factor ($\tau$, the ratio of the calorimeter or relatively long time constant to the differentiating or short time constant) and adding this to the temperature at that instant (T). By converting the temperature of the calorimeter to an electrical potential which varies in direct conformity with the temperature, and by providing a ratio determining, differentiating and adding arrangement, this expedient enables the resultant signal to indicate at any time (within a time limit provided by the differentiating circuit and the indicating meter to be actuated thereby, as for example the time constant of one second), the ultimate value which would have not otherwise been attained for 80 seconds.

Referring now more particularly to Figure 1, in an anticipator system as illustrated herein an electrical potential is supplied to the input of a D. C. amplifier to raise it to a level useful for direct indication; this amplified potential is then supplied (as through an impedance matching device) to a voltage ratio determiner arrangement for providing first and second signals having a predetermined amplitude relationship equal to that of the time constants, as for example 80 to 1; the first or larger amplitude signal is then differentiated (as in a differentiator circuit having a time constant of 1 second), and the differentiated first signal and the second signal indicating the temperature at that time are coupled to an adding indicator which utilizes the sum of the two signals for the desired purpose, as to provide a direct and relatively instantaneous indication on a high resistance voltmeter.

Referring now more particularly to Figure 2, one particular form of circuit fulfilling the conditions described in connection with Figure 1 is illustrated, such a circuit having been tested and found to be very satisfactory for the desired anticipating purposes. The electrical potential varying as a first degree function of the factor (as the output of a thermocouple in the conduction calorimeter earlier described), is amplified by a suitable amplifier and then supplied to the terminals 10 and 11 to provide the signal on one of a pair of three element arrangements in a tube 12 which may, for example, be a 6SN7. In the particular system illustrated, this tube and the circuits associated with it, provide an impedance matching and variable balancing arrangement, as for balancing out such variables as changes in plate supply voltage. This tube is illustrated as being provided with cathode resistors 13 and 14 which may, for example, be of 5,000 ohms each; as having its plate supply (as for example, 300 volts positive) provided through the movable arm 15 of a 5,000 ohm potentiometer 16 to provide an electrical balance of the space currents in the two sections of the tube; and the other grid may be returned to ground through a resistor 17 which may, for example, have a value of 2.5 megohms.

The output of this arrangement is here shown as taken off through the leads 18 and 19 to that portion of my system which provides the voltage ratio determining, differentiating, adding, and indicating operations. A high resistance voltmeter 20 may be provided merely as a check on the initial output developed through the leads 18 and 19, it being understood that this is not the meter providing the ultimate indication.

It will be understood that under conditions where the initial electrical potential has sufficient amplitude, such a D. C. amplifier arrangement would not be necessary. However, in connection with the output of a thermocouple for which the above system was designed, amplification was obviously necessary somewhere in the system if a satisfactory direct indication reading on a voltmeter is to be provided. The amplified potential thus provided is then divided into first and second signals of the predetermined amplitude relationship, this being here shown as effected by a voltage divider system comprising major and minor resistance portions here identified as 21 and 22. The major resistance portion may, for example, have a value of 100,000 ohms; and the minor resistance portion 22 is here illustrated as variable as from 0 to 2,000 ohms to enable an accurate determining of the amplitude relations of the signals in conformance with the time constant of the calorimeter in relation to the differentiator circuit. In the particular case assumed the minor resistance value would be carefully adjusted to be 1/80 of the 100,000 ohm resistance provided by the resistor 21. The first signal, or signal voltage developed across the resistor 21 is then supplied to a differentiator circuit, here shown as comprising the condenser 23 and resistor 24. For the desired 1 second time constant the condenser may have a capacity of 1 microfarad and the resistor 24 the value of 1 megohm.

While it might in theory be desirable to use an even shorter time constant, and to shorten control operations or other methods of indication such might be desirable, a one second time constant is as short as can result in satisfactory "following" by a high resistance voltmeter providing the direct indication desired, as the voltmeter 25. It will be apparent from the circuit that the voltmeter 25 is actuated by and in accordance with a resultant signal which comprises the sum of the differentiated first signal (developed across the resistor 24) and the second signal (developed across the resistor 22) indicating the temperature at that particular instant. The meter 25 thus provides substantialy instantly (in the 1 second time constant of the differentiating circuit) a signal indicating the ultimate value which would have been reached in 80 seconds by the thermocouple signal or electrical potential applied across the input terminals 10 and 11.

Referring more particularly to Figure 3, the very great advantages of this anticipator system will be immediately obvious. The curve 30 which may, for example, indicate a temperature rise of a conduction calorimeter to a temperature about 35 degrees above its surroundings, will be seen to take about 80 seconds to reach its ultimate value. The resultant signal providing the anticipating indication, however, is indicated by the curve 31; and this curve rises to its ultimate value in about one second.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for anticipating the ultimate value of an electrical potential which varies in accordance with a first degree function having a relatively long time constant, including: a voltage divider having said electrical potential applied thereto for providing first and second signals having a predetermined amplitude relationship; a resistance-capacitance circuit for differentiating the first signal, the amplitude ratio predetermined between the first and second signals being substantially the same as the ratio between said long time constant and the time constant of the dieffrentiator circuit; and means for providing a resultant signal, the sum of the second signal and the differentiated first signal, indicating in a time substantially equal to the time constant of the differentiation circuit, said ultimate value which the electrical potential will reach.

2. Apparatus for anticipating the ultimate value of an electrical potential which varies in accordance with a first degree function having a relatively long time constant, including: a voltage divider comprising major and minor reistsance portions and having said electrical potential applied thereto for providing first and second signals having a predetermined amplitude relationship; a resistance-capacitance circuit directly connected across said major resistance portion for differentiating the first signal, the amplitude ratio predetermined between the first and second signals being substantially the same as the ratio between said long time constant and the time constant of the dfferentiator circuit; and an output arrangement connected across the resistance portion of the differentiator circuit and the minor resistance portion for providing a resultant signal, the sum of the second signal and the differentiated first signal, indicating, in a time substantially equal to the time constant of the differentiator circuit, said ultimate value which the electrical potential will reach.

3. Apparatus of the character claimed in claim 1, including means for amplifying said electrical potential before applying it to the voltage divider, and a high resistance voltmeter actuated by the resultant signal.

4. Apparatus for anticipating the ultimate temperature of a long time constant calorimeter which produces an electrical potential directly proportional to its instantaneous temperature, including: a voltage divider comprising major and minor resistance portions and having said electrical potential applied thereto for providing first and second signals having a predetermined amplitude relationship; a resistance-capacitance circuit directly connected across said major resistance portion for differentiating the first signal, the amplitude ratio predetermined between the first and second signals being substantially the same as the ratio between said long time constant and the time constant of the differentiator circuit; and an output arrangement connected across the resistance portion of the differentiator circuit and the minor resistance portion for providing a resultant signal, the sum of the second signal and the differentiated first signal indicating, in a time substantially equal to the time constant of the differentiator circuit, said ultimate temperature which the calorimeter will reach.

5. Apparatus for anticipating the ultimate value of an electrical potential which varies in accordance with a first degree function having a relatively long time constant, including: a balanced cathode follower, having the electrical potential applied to the input terminals thereof; a voltage divider having the output of said cathode follower applied thereto for providing first and second signals having a predetermined amplitude relationship; a resistance-capacitance circuit for differentiating the first signal, the amplitude ratio predetermined between the first and second signals being substantially the same as the ratio between said long time constant and the time constant of the differentiator circuit; and means for providing a resultant signal, the sum of the second signal and the differentiated first signal indicating, in a time substantially equal to the time constant of the differentiator circuit, said ultimate value which the electrical potential will reach.

6. Apparatus for anticipating the ultimate value of an electrical potential which varies in accordance with a first degree function having a relatively long time constant, including: two matched electronic tubes each having at least a cathode, a grid and an anode, and each having substantially identical cathode resistors operatively connected thereto, one of said tubes having said electrical potential applied between its grid and cathode and the other having its grid returned to its cathode; a potentiometer having a resistance element and a movable contact arm, the resistance element being connected between the anodes of said tubes; a source of D. C. voltage connected to said movable arm, said movable arm being adapted to balance the space currents of said tubes when no signal is applied to the grid of said one tube; a voltage divider comprising major and minor resistance portions connected between the cathodes of said tubes for providing first and second signals having a predetermined amplitude relationship; a resistance-capacitance circuit directly connected across said major resistance portion for differentiating the first signal, the amplitude ratio predetermined between the first and second signals being substantially the same as the ratio between said long time constant and the time constant of the differentiator circuit; and an output arrangement connected to the differentiator circuit and the minor resistance portion for providing a resultant signal, the sum of the second signal and the differentiated first signal, indicating, in a time substantially equal to the time constant of the differentiator circuit, said ultimate value which the electrical potential will reach.

References Cited in the file of this patent

UNITED STATES PATENTS

| | | |
|---|---|---|
| 2,436,891 | Higinbotham | Mar. 2, 1948 |
| 2,519,223 | Cheek | Aug. 15, 1950 |
| 2,567,532 | Stephenson | Sept. 11, 1951 |
| 2,609,686 | Peterson | Sept. 9, 1952 |

FOREIGN PATENTS

| | | |
|---|---|---|
| 620,503 | Great Britain | Mar. 25, 1949 |

OTHER REFERENCES

Proc. of the IRE, "Analysis of Problems in Dynamics by Electronic Circuits" by Ragazini et al., May 1947, pp. 444–452.

Electronic Engineering, "Electrical Analogue Computing" (part 1) by Mynall, June 1947, pp. 178–180.

Electronic Engineering, "Electrical Analogue Computing" (part 4) by Mynall, Sept. 1947, pp. 283–285.

Proc. of the National Electronics Conference, vol. 5, "Linear Electronic Analog Computer Design" by Meneley and Morrill, 1950, pp. 48–63.

Bell Laboratories Record, "General Purpose Analogue Computer" by Currie, March 1951, pp. 101–108.